(12) United States Patent
Matula et al.

(10) Patent No.: US 7,452,417 B2
(45) Date of Patent: *Nov. 18, 2008

(54) DOWNHOLE SERVICING COMPOSITIONS HAVING HIGH THERMAL CONDUCTIVITIES AND METHODS OF USING THE SAME

(75) Inventors: Gary W. Matula, Houston, TX (US); Toby N. McClain, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/422,277

(22) Filed: Jun. 5, 2006

(65) Prior Publication Data

US 2006/0243166 A1    Nov. 2, 2006

Related U.S. Application Data

(63) Continuation-in-part of application No. 11/099,023, filed on Apr. 5, 2005, and a continuation-in-part of application No. 10/767,690, filed on Jan. 29, 2004, now Pat. No. 7,067,004.

(51) Int. Cl.
C04B 7/00 (2006.01)
C04B 12/00 (2006.01)
C04B 16/00 (2006.01)

(52) U.S. Cl. .................. 106/638; 106/803; 106/805; 106/806; 106/809; 106/812; 106/DIG. 4; 507/100; 507/103; 507/106; 507/107; 507/108; 507/119; 507/128; 507/142; 507/143

(58) Field of Classification Search .............. 106/638, 106/803, 805, 806, 809, 812, DIG. 4; 507/100, 507/103, 106, 107, 108, 119, 128, 142, 143
See application file for complete search history.

(56) References Cited

U.S. PATENT DOCUMENTS

| 2,553,654 | A | 5/1951 | Heise |
|---|---|---|---|
| 3,573,427 | A | 4/1971 | Minsk |
| 3,725,669 | A | 4/1973 | Tatum |
| 3,941,918 | A | 3/1976 | Nigol et al. |
| 3,962,142 | A | 6/1976 | Freeman et al. |
| 4,050,950 | A | 9/1977 | Brewer et al. |
| 4,177,078 | A | 12/1979 | Welna et al. |
| 4,291,008 | A | 9/1981 | Hsu et al. |
| 4,361,661 | A | 11/1982 | Jackson et al. |
| 4,696,698 | A | 9/1987 | Harriett |
| 4,696,699 | A | 9/1987 | Harriett |
| 4,786,388 | A | 11/1988 | Tatum, Jr. |
| 4,797,158 | A | 1/1989 | Harriett |
| 4,806,272 | A | 2/1989 | Wiley |
| 4,886,550 | A | 12/1989 | Alexander |
| 4,948,428 | A | 8/1990 | Liao |
| 4,994,629 | A | 2/1991 | Tatum, Jr. |
| 5,026,508 | A | 6/1991 | Tatum, Jr. |
| 5,080,773 | A | 1/1992 | Tatum, Jr. |
| 5,226,961 | A | 7/1993 | Nahm et al. |
| 5,389,146 | A | 2/1995 | Liao |
| 5,488,991 | A | 2/1996 | Cowan et al. |
| 5,826,669 | A | 10/1998 | Zaleski et al. |
| 6,006,831 | A | 12/1999 | Schlemmer et al. |
| 6,105,674 | A | 8/2000 | Liao et al. |
| 6,150,601 | A | 11/2000 | Schnatzmeyer et al. |
| 6,152,227 | A | 11/2000 | Lawson et al. |
| 6,208,265 | B1 | 3/2001 | Smith |
| 6,251,179 | B1 | 6/2001 | Allan |
| 6,258,160 | B1 | 7/2001 | Chatterji et al. |
| 6,395,199 | B1 | 5/2002 | Krassowski et al. |
| 6,461,424 | B1 | 10/2002 | Ramme |

(Continued)

FOREIGN PATENT DOCUMENTS

EP    1 065 451 A    1/2001

(Continued)

OTHER PUBLICATIONS

Brookhaven National Laboratory, "Thermally Conductive Cementitious Grouts For Geothermal Heat Pumps" *undated* but admitted to be prior art.

(Continued)

*Primary Examiner*—Elizabeth D Wood
(74) *Attorney, Agent, or Firm*—Craig W. Roddy; Conley Rose, P.C.

(57) ABSTRACT

A downhole servicing composition comprising from about 15 percent to about 80 percent by weight of a clay, and from about 10 percent to about 75 percent by weight of a carbon source is disclosed. The invention includes a downhole servicing composition comprising from about 15 percent to about 45 percent by weight of a first clay, from about 15 percent to about 45 percent by weight of a second clay, from about 10 percent to about 35 percent by weight of a filler, and from about 10 percent to about 75 percent by weight of a carbon source. The invention also includes a downhole servicing composition comprising an aqueous base and from about 10 percent to about 75 percent by weight of flaked graphite, wherein the downhole servicing composition has a thermal conductivity not less than about 0.8 BTU/hr-ft-° F.

25 Claims, No Drawings

U.S. PATENT DOCUMENTS

| | | |
|---|---|---|
| 6,502,636 B2 | 1/2003 | Chatterji et al. |
| 6,644,891 B2 | 11/2003 | Caslini et al. |
| 6,821,336 B1 | 11/2004 | Ramme |
| 7,067,004 B2 | 6/2006 | Matula |
| 2002/0056404 A1 | 5/2002 | Chatterji et al. |
| 2003/0085039 A1 | 5/2003 | DiFoggio |
| 2003/0188666 A1 | 10/2003 | Johnson, Jr. et al. |
| 2005/0166802 A1 | 8/2005 | Matula et al. |
| 2005/0205834 A1 | 9/2005 | Matula et al. |

FOREIGN PATENT DOCUMENTS

| | | | |
|---|---|---|---|
| WO | WO 95/14643 A | 6/1995 | |
| WO | 9722677 A1 | 6/1997 | |

OTHER PUBLICATIONS

Foreign communication from a related counterpart application dated Jun. 17, 2005.

Loresco brochure entitled "Envirocoke IV™ Conductive Carbon Grout."

Office action dated Jul. 22, 2004 from U.S. Appl. No. 10/767,690.

Office action dated Aug. 23, 2005 from U.S. Appl. No. 10/767,690.

Foreign communication from a related counterpart application dated Aug. 22, 2006.

Foreign Communication from a related counterpart application-International Search Report and Written Opinion, Application No. PCT/GB2007/002055 dated Sep. 3, 2007, 10 pgs.

Office Action dated Jun. 28, 2007 (14 pages), U.S. Appl. No. 11/099,023 filed on Apr. 05, 2005.

DOWNHOLE SERVICING COMPOSITIONS HAVING HIGH THERMAL CONDUCTIVITIES AND METHODS OF USING THE SAME

CROSS-REFERENCE TO RELATED APPLICATION

This present application is a continuation-in-part of U.S. patent application Ser. No. 10/767,690 filed Jan. 29, 2004 now U.S. Pat. No. 7,067,004 and U.S. patent application Ser. No. 11/099,023 filed Apr. 5, 2005, which are incorporated by reference as if reproduced in their entirety.

FIELD OF THE INVENTION

This invention generally relates to thermally conductive downhole servicing compositions. More specifically, the invention relates to grout compositions having relatively high thermal conductivities and low hydraulic conductivities and methods of using the same to install a heat transfer loop in the earth.

This invention also relates to fluids having high thermal conductivity or low thermal resistivity and their use underground. More particularly, this invention relates to products and methods for dissipating heat underground, particularly heat associated with buried high voltage power lines and other buried electrical transmission and distribution equipment such as cables.

BACKGROUND OF THE INVENTION

Heat transfer loops are often placed in the earth to provide for the heating and cooling of residential and commercial spaces. Since ground temperatures are generally similar to room temperatures in buildings, the use of such heat transfer loops can be cost effective alternatives to conventional heating and cooling systems. The installation of such heat transfer loops involves inserting a continuous loop of pipe connected to a heat pump unit into a hole or series of holes in the earth to act as a heat exchanger. A thermally conductive grout is then placed in the hole between the pipe wall and the earth. A heat transfer fluid can be circulated through the underground heat transfer loop to allow heat to be transferred between the earth and the fluid via conduction through the grout and the pipe wall. When the system is operating in a heating mode, a relatively cool heat transfer fluid is circulated through the heat transfer loop to allow heat to be transferred from the warmer earth into the fluid. Similarly, when the system is operating in a cooling mode, a relatively warm heat transfer fluid is circulated through the heat transfer loop to allow heat to be transferred from the fluid to the cooler earth. Thus, the earth can serve as both a heat supplier and a heat sink.

The efficiency of the heat transfer loop is affected by the grout employed to provide a heat exchange pathway and a seal from the surface of the earth down through the hole. The grout needs to have a relatively high thermal conductivity to ensure that heat is readily transferred between the heat transfer fluid and the earth. Further, the grout may form a seal that is substantially impermeable to fluids that could leak into and contaminate ground water penetrated by the hole in which it resides. Even if the fluids do not penetrate the ground water, a seal is still desirable. The hydraulic conductivity, which measures the rate of movement of fluid (i.e., distance/time) through the grout, is thus desirably low. Moreover, the grout needs to have a relatively low viscosity to allow for its placement in the space between the heat transfer loop and the earth, thereby displacing any drilling fluid residing therein. In an attempt to achieve such properties, two types of grouts containing sand to enhance their thermal conductivity, i.e., bentonite-based grout and cement-based grout, have been developed that are extremely labor intensive to prepare. In particular, conventional grouts often require several hundred pounds of sand to render them suitably thermally conductive. Unfortunately, the thermal conductivity that may be achieved by these conventional grouts is limited by the amount of sand that can be incorporated into and properly suspended in the grout. Also, the preparation of such grouts is inflexible in that the concentrations of the components and the mixing procedures must be precise to avoid problems in the field. Further, cement-based grout has the limitation of being very expensive.

A need therefore: exists for an improved grout for use in sealing a heat transfer loop to the earth. It is desirable for the grout to have a higher thermal conductivity and a lower hydraulic conductivity than conventional grouts while at the same time being relatively easy and inexpensive to prepare. It is also desirable for the grout to have some flexibility in the way it can be prepared.

Increasingly, electrical equipment such as high voltage transmission and distribution power lines are being installed (or buried) underground, for safety, ecological, aesthetic, and/or operational reasons. For example, the advantages of buried power lines in tropical regions, where above ground lines are vulnerable to high winds and rains due to tropical storms and hurricanes, are readily apparent However, the capabilities of such installations are limited by the ability of the installations to dissipate heat generated by the flow of electrical power through the equipment. If the thermal resistivity of the environment surrounding the buried equipment is unsatisfactorily high, the heat generated during functioning of the equipment can cause an increase in the temperature of the equipment beyond tolerable limits resulting over time in the premature failure or destruction of the equipment. At the very least, the equipment's life expectancy is decreased, which is an economic disadvantage.

Currently, cable is installed by either digging a trench and backfilling around the cable with a thermally conductive material, or drilling a bore hole, pulling the cable through the bore hole, and placing a thermally conductive material around this cable. The industry typically addresses dissipation of heat around buried power lines in one of two basic ways, both of which involve placing a thermally conductive material around the outside of power line cable (whether or not the cable is strung through a carrier pipe). One way uses bentonite grout to which sand may be added to increase thermal conductivity. The other way uses a cement or similar cementitious material containing sand to provide thermal enhancement. The thermally conductive material is typically installed by either digging a trench and backfilling around the cable with the thermally conductive material or by drilling a bore (hole) and then pulling the cable through the bore containing the thermal enhancement material.

Without sand, bentonite grout does not have high thermal conductivity properties. Typical thermal conductivity values for bentonite grouts range from about 0.4 to about 0.6 BTU/hr-ft-° F. The addition of sand of an appropriate size can increase such thermal conductivity to a range of about 1.0 to about 1.2 BTU/hr-ft-° F. However, the sand can cause placement problems and high pump pressures when positioning as the thermally conductive grout. In horizontal heat loops, high pump pressures can lead to a "frac out" situation where the material induces fractures in the soil through which the material can break through to the surface. Use of cement grout can magnify such problems. Use of sand can also lead to excessive friction, prematurely wearing out pumps and their various parts. For example, in the case of a pipe bundle containing cables, such friction from sand can result in pulling forces that can exceed the strength of the bundle causing the bundle to separate during installation. Backfilling soil with sand added after the pipe installation might be used to avoid such installation friction but backfilling may not always be possible or effective for the fill length of the installation. Further, additional wear caused by the sand to pumps and pump parts remains a concern.

SUMMARY OF THE INVENTION

In one aspect, the invention includes a downhole servicing composition comprising from about 15 percent to about 80 percent by weight of a clay, and from about 10 percent to about 75 percent by weight of a carbon source. In one embodiment, the downhole servicing composition further comprises up to about 2 percent by weight of an alkaline earth metal oxide or an alkaline earth metal hydroxide. The alkaline earth metal oxide or earth metal hydroxide may be magnesium oxide, strontium oxide, calcium hydroxide, barium hydroxide, or combinations thereof. In another embodiment, the downhole servicing composition further comprises from about 2 percent to about 10 percent by weight of a dispersant. The dispersant may be ammonium lignosulfonate salt, a metal lignosulfonate salt, a phosphate, a polyphosphate, an organophosphate, a phosphonate, a tannin, leonardite, a polyacrylate, or combinations thereof. In yet another embodiment, the downhole servicing composition further comprises water. The downhole servicing composition may have a thermal conductivity not less than about 0.8 BTU/hr-ft-° F. when the dry components are present in an amount not exceeding about 50 percent by weight of the slurry. Optionally, the downhole servicing composition has a thermal conductivity not less than about 0.8 BTU/hr-ft-° F.

In a second aspect, the invention includes a downhole servicing composition comprising from about 15 percent to about 45 percent by weight of a first clay, from about 15 percent to about 45 percent by weight of a second clay, from about 10 percent to about 35 percent by weight of a filler, and from about 10 percent to about 75 percent by weight of a carbon source. In one embodiment, the f clay has a first swelling rate, and the second clay has a second swelling rate less than the first swelling rate. The first clay may be sodium bentonite, montmorillonite, beidellite, nontronite, hectorite, samonite, smectite, or combinations thereof, while the second clay may be calcium bentonite. In another embodiment, the filler is silica flour, silica fume, fly ash, pozzolan, sand, barite, zeolites, powdered glass, or combinations thereof. The downhole servicing composition may be substantially free of water. The carbon source may be petroleum coke, pitch coke, tar coke, powdered carbon, flaked graphite, amorphous carbon, vein carbon, crystalline carbon, synthetic carbon, or combinations thereof.

In a third aspect, the invention includes a downhole servicing composition comprising an aqueous base and from about 10 percent to about 75 percent by weight of flaked graphite, wherein the downhole servicing composition has a thermal conductivity not less than about 0.8 BTU/hr-ft-° F. In one embodiment the downhole servicing composition is substantially free of said. In another embodiment, the downhole servicing composition has a hydraulic conductivity of from about $5 \times 10^{-9}$ cm/s to about $1 \times 10^{-7}$ cm/s. The invention includes a grout comprising the downhole servicing composition and a drilling fluid comprising the downhole servicing composition.

DETAILED DESCRIPTION OF THE PREFERRED EMBODIMENTS

Downhole servicing slurries having an improved thermal conductivity of greater than about 0.8 BTU/hr-ft-° F. may be employed to install a conduit in one or more holes in the earth. As used herein, "downhole servicing composition" refers to a fluid that is placed into or circulated through a wellbore or trench to enhance or improve the properties of the wellbore or trench. The term downhole servicing composition expressly includes grouts, cements, and drilling fluids. Their high thermal conductivities and relatively low hydraulic conductivities give them the ability to form very good thermally conductive seals around the conduit. As used herein, "conduit" refers to a material through which fluid or a current may flow, wherein the conduit may be hollow to allow the passage of fluid therethrough or solid to allow the flow of current therethrough. The conduit may be, for example, a heat transfer loop or a grounding rod. It is understood that the earth may be exposed or it may be covered by water such as sea or ocean water.

As will be described in more detail later, the grout slurries may be formed by combining a grout composition that is preferably a one-sack product with water. As used herein, "one-sack prod-act" refers to a form of the grout composition in which its components are combined together in a single container such as a sack, allowing the grout composition to be easily transported to an on-site location where it will be used to form a grout slurry. The resulting grout slurries can be pumped into the hole in the earth and allowed to set in the space between the walls of the conduit and the earth. The solids content (i.e., the amount of the grout composition) in the grout slurries can be varied to achieve a desirable thermal conductivity therein and need not be very high to achieve desirable properties in the slurry. An exemplary grout slurry exhibits a relatively high thermal conductivity, a relatively low hydraulic conductivity after setting, and a relatively low pumping viscosity when the amount of the grout composition present in the grout slurry is in the range of from about 35% to about 50% by weight of the grout slurry, alternatively from about 35% to about 45% by weight of the grout slurry.

Grout compositions that may be used to form such grout slurries contain components that enhance the various properties of the slurries. In an embodiment, grout compositions comprising sodium bentonite, calcium bentonite, a silica material, a carbon source, an alkaline earth metal oxide, and a dispersant may be used to install a conduit in a hole in the earth. The specific concentrations of the components in the grout compositions are as follows: calcium bentonite present in an amount of from about 15% to about 45%; sodium bentonite present in an amount of from about 15% to about 45%; a silica material present in an amount of from about 10% to about 35%; and a carbon source present in an amount of from about 10% to about 75%; optionally an alkaline earth metal oxide present in an amount of from about 0% to about 2%; and optionally a dispersant present in an amount of from about 2% to about 10%, all percentages (%'s) being by weight of the grout compositions.

Sodium bentonite is a water-swellable clay in which the principal exchangeable cation is a sodium ion. Its use in the grout compositions serves to enhance the viscosity of the grout slurries such that the solid particles contained therein can be transported to a desired location. The sodium bentonite also contributes to the low hydraulic conductivity of the grout slurries and thus enhances the ability of the slurries to form a good seal between the heat transfer loop and the earth. Examples of suitable sodium bentonite clays include Wyoming sodium bentonite, Western sodium bentonite, and combinations thereof. The sodium bentonite used in the grout compositions preferably has a 30-mesh grind size, but other grind sizes of the sodium bentonite may also be used. In alternative embodiments, the sodium bentonite may be supplemented by or substituted with other types of swellable clays known in the art such as montmorillonite, beidellite, nontronite, hectorite, samonite, smectite, or combinations thereof Calcium bentonite is a clay in which the principal exchangeable cation is a calcium ion. It has a much slower hydration or swelling rate and degree of swelling than sodium bentonite and thus provides for improved control over the placement of the grout slurries. Various grind sizes of the calcium bentonite may be used, with a 200-mesh grind size being preferred.

The carbon source serves to improve the thermal conductivity of the grout slurries. Examples of suitable carbon sources include desulfurized petroleum coke, powdered carbon, flaked graphite, and combinations thereof, with flaked graphite being preferred. Desulfurized petroleum coke is described in U.S. Pat. No. 4,291,008, which is incorporated by reference herein in its entirety. Powdered carbon is an amorphous carbon having a particle size generally less than about 0.8 mm. Flaked graphite is a form of graphite present in gray cast iron that appears in the microstructure as an elongated, curved inclusion. Due to its relatively low resistivity and thin shape, it can become interlaced between the other types of particles in the grout slurries to form a conductive path in the slurries. Other examples of suitable carbons source include pitch coke, tar coke, amorphous carbon, vein carbon, crystalline carbon, synthetic carbon, or combinations thereof.

The silica material acts as a filler and contributes to the good hydraulic conductivity and thermal conductivity exhibited by the grout slurries. The silica material is preferably silica flour, which is a finely ground silica generally having a particle size of less than or equal to about 40 microns. Examples of other suitable silica materials include condensed silica fume. Condensed silica fume is a by-product of the manufacture of silicon or ferrosilicon, which involves subjecting quartz (when silicon is produced) or quartz and an iron-bearing material (when ferrosilicon is produced) to reduction with coke or coal and wood chips in a furnace. A gaseous suboxide of silicon forms, and a portion of the gaseous suboxide escapes into the atmosphere where it reacts with oxygen and condenses to form the glassy microscopic particles known as condensed silica fume. The particle size of condensed silica fume is generally smaller than about 1 micron. In addition, other inert fillers may be used, such as sand, barite, zeolites, powdered glass, and combinations thereof.

The alkaline earth metal oxide or alkaline earth metal hydroxide improves the set strength of the grout slurries and the hydraulic conductivity of the slurries. Various alkaline earth metal oxides can be employed in the grout compositions, including magnesium oxide, strontium oxide, or combinations thereof. The preferred alkaline earth metal oxide is magnesium oxide. Examples of suitable alkaline earth metal hydroxides include calcium hydroxide, barium hydroxide, and combinations thereof.

In addition, various dispersants or thinners suitable for use with the other components in the grout compositions can be employed. Examples of suitable dispersants include ammonium lignosulfonate salt, metal lignosulfonate salts, phosphates, polyphosphates, organophosphates, phosphonates, tannins, leonardite, polyacrylates having a molecular weight less than about 10,000, and combinations thereof. A preferred dispersant is sodium acid pyrophosphate (SAPP). When the finer sodium bentonite grind sizes are used, the concentration of the SAPP used in conjunction with the sodium bentonite is near the upper limit of the previously mentioned SAPP concentration range.

The grout compositions may further include additional additives as deemed appropriate by one skilled in the art. Suitable additives would bring about desired results without adversely affecting other components in the grouting composition or the properties thereof.

In an embodiment, the grout compositions comprise a first clay such as sodium bentonite present in an amount of from about 15% to about 45%, alternatively from about 15% to about 20%; a second clay such as calcium bentonite present in an amount of from about 15% to about 45%, alternatively from about 15% to about 20%; a filler such as silica material present in an amount of from about 10% to about 35%, alternatively from about 10% to about 20%; a carbon source present in an amount of from about 10% to about 75%, alternatively from about 40% to about 50%; an alkaline earth metal oxide or alkaline earth metal hydroxide present in an amount up to about 2%, alternatively from about 0.5% to about 1%; and a dispersant present in an amount of from about 2% to about 10%, alternatively from about 4% to about 7%, all by weight of the grout compositions. In a preferred embodiment, the grout compositions comprise calcium bentonite present in an amount of about 17.5%, sodium bentonite present in an amount of about 17.5%, a silica material present in an amount of about 14.5%, a carbon source present in an amount of about 45%, an alkaline earth metal oxide present in an amount of about 0.5%, and a dispersant present in an amount of about 5%, all by weight of the grout compositions.

The grout compositions may be made by combining all of the components in any order and thoroughly mixing the components in a manner known to one skilled in the art. In a preferred embodiment, the grout compositions are manufactured off-site and then shipped as a one-sack product to the location where it is to be used to install an underground conduit.

Methods of installing a conduit in a hole in the earth comprise placing the conduit in the hole in the earth, mixing one of the foregoing grout compositions, which may be a one-sack product, with water to form a grout slurry, and placing the grout slurry in the hole adjacent to the conduit. The hole in the earth may be a borehole that has been drilled in the earth to a depth sufficient to hold the conduit therein. The grout slurry may be pumped into the space between the conduit and the walls of the hole until the space is filled with the slurry. After the placement of the grout slurry, it is allowed to set, thus forming a thermally conductive seal between the conduit and the earth. The water utilized in the grout slurry can be water from any source provided that it does not adversely affect the components or properties of the slurry and that it would not contaminate nearby soil. Preferably, fresh water in an amount sufficient to form a pumpable slurry is mixed with the grout composition. The water and the grout composition may be mixed to form the grout slurry using a standard mixing device such as a grouter or other similarly functioning device. The grout slurry preferably comprises from about 35% to about 45% of the grout composition by weight of the grout slurry and a balance of the water.

The set grout slurry seals the conduit within the hole in the earth and acts as a heat transfer medium between the conduit and the earth. In one embodiment, the conduit may be a heat transfer loop through which a heat transfer fluid flows. Heat may be transferred between the earth and the heat transfer fluid via the set grout slurry and the walls of the heat transfer loop for the purpose of heating and/or cooling a space such as a building located above the surface of the earth. In another embodiment, the conduit may be a grounding rod used to protect structures such as television towers and radio antennas from lightning strikes. The grounding rod may extend from the top of such structure down to the set grout slurry, which has a relatively low resistivity. As such, if lightning strikes the grounding rod, the current created by the lightning may pass through the grounding rod and the set grout slurry to the ground.

After the grout slurry has set, it exhibits excellent properties that allow it to be used in the manner described above. The thermal conductivity, k, of the grout slurry varies depending on the particular concentration of the grout composition (i.e., the solids) in the slurry, with the thermal conductivity increasing as the grout composition increases. The grout slurry can be prepared inexpensively since the amount of the grout composition needed relative to the amount of water is relatively low. Further, less labor is required to prepare the grout slurry such that several holes in the earth can be filled more quickly. Based on measurements taken using a thermal conductivity meter made in-house at Halliburton Energy Services, Inc. (hereinafter a "Baroid thermal conductivity meter"), the grout slurry has a high thermal conductivity of, for example, greater than or equal to about 0.8 BTU/hr-ft-° F., greater than or equal to about 0.9 BTU/hr-ft-F, greater than or equal to about 1.0 BTU/hr-ft-° F., greater than or equal to about 1.1 BTU/hr-ft-° F., greater than or equal to about 1.2 BTU/hr-ft-° F., greater than or equal to about 1.3 BTU/br-ft-° F., greater than or equal to about 1.4 BTU/hr-ft-° F., greater than or equal to about 1.5 BTU/hr-ft-° F., or greater than or equal to about 1.6 BTU/hr-ft-° F. In addition, the grout slurry has a low hydraulic conductivity, K, of from about $5\times10^{-9}$ cm/s to about $1\times10^{-7}$ cm/s. While the thermal conductivity of the grout slurry indicates its ability to transfer heat, the hydraulic conductivity of the grout slurry indicates its resistance to fluids and thus measures its sealing ability. The lower the hydraulic conductivity of the set grout slurry, the better the seal it forms. As such, fluids are less likely to leak through the grout slurry from the surface into sub-surface ground water or wet soil. The grout slurry thus acts as a barrier to prevent contamination of such ground water or soil. Further, fluids such as oil, gas, and water in subterranean formations or zones are less likely to pass into other subterranean zones via the gout slurry. Details regarding the manner in which the thermal conductivity and the hydraulic conductivity can be determined are provided in the examples below.

The grout slurry also has a good working time, i.e., the time period between when it is prepared and when its viscosity is insufficient to allow it to be displaced into a space. For example, its working time may range from about 15 minutes to about 30 minutes. Furthermore, for a grout slurry comprising less than or equal to about 40% solids (i.e., grout composition) by weight of the slurry, the viscosity of the grout slurry is less than about 600 centipoise (cp) as measured using a FANN 35A rotational viscometer with a 5× torsion spring at 300 rpm. As such, the grout slurry can be pumped into the hole in the earth using, e.g., a grouter, without having to use relatively high pump pressures. The grout slurry also exhibits a good set strength, which is also referred to as the shear strength. For example, the set strength typically is greater than or equal about 2,000 lbs/100 ft² for a grout slurry comprising 35% solids, greater than or equal to about 3,000 lbs/100 ft² for a grout slurry comprising 40% solids, and greater than or equal to about 4,000 lbs/100 ft² for a grout slurry comprising 45% solids, all % solids being by weight of the grout slurry. In addition, the grout slurry experiences minimal or no subsidence after placement. Moreover, it is believed that the grout slurry is environmentally friendly such that there is no need to be concerned that it could contaminate drinking water.

In an embodiment, the grout slurry may be placed in and allowed to set in a series of holes through which a continuous heat transfer loop, e.g., piping, has been run. The greater the number of holes, the more surface area of earth is exposed for heat transfer. Due to the higher thermal conductivity of the grout slurry described herein, less holes may be required to achieve the same amount of heat transfer as compared to using a conventional grout slurry. Therefore, the cost of a heat transfer system, which comprises holes in the earth and a heat transfer loop passing from a heat pump through the holes and back to the heat pump, may be lowered by using the grout slurry described herein to seal the holes. In an embodiment of the present invention, a highly thermally conductive fluid (or a fluid having low resistivity) is placed around buried or underground electrical equipment, such as, for example, high voltage power lines, to dissipate heat given off by the equipment in C-operation. Such heat dissipation allows more efficient flow of electricity through the equipment. The increased heat dissipation away from the high voltage cable allows the cable to operate more efficiently by allowing increased amounts of electricity to flow through the cable. The increased heat dissipation also prolongs the life of the cable. Further, such dissipation helps keep the heat within operational design limitations for the equipment and thus does not contribute to or cause excess wear of the equipment.

Any aqueous based drilling fluid suitable for trenchless drilling or for digging or excavating trenches is believed suitable for use as the base of the fluid product of the invention, provided the drilling fluid is capable of suspending flaked graphite and preferably is capable of gelling to a consistency ranging from that commonly found in pudding to that commonly found in peanut butter. Aqueous bentonitic drilling fluids are most preferred. Also preferably the drilling fluid base and the fluid product of the invention will not contain compounds that provide high resistivity or low thermal conductivity characteristics to the fluid. The fluid product should be pumpable and substantially free of sand. Silica flour, preferably about 200 mesh material, may be added as a supplemental thermal enhancement material as well as to assist in achieving a low hydraulic conductivity. The use of silica flour also contributes to the final set of the product. Silica flour may also assist in achieving low hydraulic conductivity, a separate parameter not generally affected by thermal enhancement. Such silica flour lacks the abrasiveness and density of sand and thus affords utility in a drilling fluid not practicable with sand. Graphite is added to the fluid to improve the fluid's thermal conductivity properties. Preferably the graphite is flaked. The specific amount of graphite added dictates the amount or degree of the resulting thermally conductive properties, and such relationship affords significant flexibility to the fluid. For example, to achieve a thermal conductivity of about 1.0 BTU/hr-ft-° F., about 145 pounds of flaked graphite per 100 gallons of aqueous drilling fluid would typically be needed. However, thermal conductivities of about 1.6 to about 1.7 BTU/hr-ft-° F. or higher are achievable when adding flaked graphite to aqueous drilling fluid. The graphite may be added to aqueous fluid already prepared or being used for drilling in the field, or the fluid may be originally prepared to include the graphite.

The fluid should remain pumpable upon addition of the graphite and under subterranean conditions, at least for a time sufficient to allow or to facilitate placement of the fluid in the borehole being drilled or the trench being dug or filled or in a pipe being filled. The fluid may optionally comprise a gellant or equivalent component(s) to turn the fluid into a semi-solid or solid following such placement.

To fully appreciate the benefits of the invention, the fluid product of the invention is placed adjacent or proximate to the electrical equipment and preferably between the equipment and the soil covering or burying the equipment for dissipation of heat from the equipment during operation or use of the equipment. When the equipment comprises power lines, the lines may be encased in pipe or not, as the invention is effective in providing a thermally conductive environment in either situation.

According to one method of the invention, electrical equipment is installed by trenchless drilling, wherein a hole for receiving the equipment is drilled employing the fluid product of the invention. The fluid product of the invention may be used in drilling all or a portion of the hole. In one embodiment, a typical or traditional bentonitic drilling fluid may be used for drilling a horizontal borehole and just prior to pulling pipe and/or cable into the bore, the bentonitic drilling fluid is either replaced with the fluid of the invention or effectively made into the drilling fluid of the present invention by adding graphite thereto. During and after such drilling with the fluid of the invention, at least some of said fluid and particularly some graphite in said fluid deposits on the sides of said borehole and/or otherwise remains in said borehole. The electrical equipment, one or more high voltage power lines for example, is pulled through the borehole for positioning underground. The graphite provides an additional benefit of some lubrication for said pulling or installation of the electrical equipment. The amount of graphite included in the fluid depends on the thermal conductivity (resistivity) desired, as discussed above. Optionally, the fluid product of the invention remaining in the borehole may increase in viscosity, and may also harden, or transform to a solid or semi-solid During another method of the invention, electrical equipment is installed by drilling or excavating a trench, positioning the equipment in the trench, and then covering the equipment and/or backfilling the trench with soil. In this method, the fluid product of the invention may be used as a drilling fluid in excavating the trench and/or may be flowed in the trench after it is dug and preferably before the equipment is positioned in the trench. Additionally, or alternatively, the product of the invention may be added to the soil for use in the backfilling of the trench (after the equipment is positioned in the trench). Thus, in at least one such point in the installation, the fluid product of the invention is included so that it is adjacent to the equipment to facilitate dissipation of heat during use of the equipment.

In another method of the invention, the fluid product of the invention is flowed into and/or through the inside or interior of a protective covering for the equipment, such as inside pipe encasing power lines or cable for example, preferably before the pipe is installed underground. During such flow, at least some of said fluid and particularly some graphite in said fluid deposits on the sides of said equipment and/or protective covering of said equipment. Preferably, the underground installation of the equipment will be conducted by trenchless drilling using the fluid product of the invention.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

Three samples of a grout composition were prepared that contained 17.5% 30-mesh sodium bentonite, 17.5% 200-mesh calcium bentonite, 0.5% magnesium oxide, 5% sodium acid pyrophosphate, 14.5% silica flour, and 45% flaked graphite, all by weight of the grout composition. The three samples were added to different amounts of fresh water while blending over a 30-second period, followed by blending the resulting mixtures for an additional 90 seconds, thereby forming three grout slurries containing 35%, 40%, and 45% of the grout composition, respectively. This blending was performed using a LAB MASTER G3UO5R mixer commercially available from Lightnin® Mixer Co. The thermal conductivity of each grout slurry was measured using the Baroid thermal conductivity meter (TCM) in accordance with the following procedure. The communication box of the TCM was electrically coupled to a computer and to the thermal conductivity device of the TCM. Then 400 mL of the grout slurry was poured into the thermal conductivity device up to a level directly below a sensor at the top of the device. A cap was next placed on the thermal conductivity device, and the power of the communication box was turned on. The TCM program was then run on the computer. The heater of the TCM was turned on using the computer. Data collection began immediately after the heater was turned on. The TCM readings were allowed to stabilize, and such readings were taken for about 6 hours or more after stabilization had been achieved. The readings were then saved into an EXCEL spreadsheet upon test completion. The thermal conductivity measured for each grout slurry sample is shown in Table 1 below.

TABLE 1

| Amount of Grout Composition in the Grout Slurry, % by weight of the slurry | Thermal Conductivity, BTU/hr-ft-° F. |
| --- | --- |
| 35% | 1.1 |
| 40% | 1.3 |
| 45% | 1.6 |

Example 2

The hydraulic conductivity of a grout slurry sample (the IDP-357 slurry) made as described in this application and two control grout slurry samples (the IDP-232 slurry and the BAROTHERM slurry) were tested using the following procedure. Each grout slurry sample was prepared by adding the appropriate amount of the dry grout composition (188.5 grams for the 35% solids sample, 233.33 grams for the 40% solids sample, and 286.4 grams for the 45% solids sample) to 350 mL deionized water over a period of 30 seconds, followed by mixing the dry grout composition with the water for 1 minute after completing the addition of the dry grout composition. The LAB MASTER G3UO5R mixer set at 1,000 rpm was used for this mixing. The grout slurry was then immediately poured into a filter press cell containing ¼ inch of fine sand. The grout slurry was allowed to set for 4 hours, and then deionized water was poured on top of the set grout slurry. The filter press was subsequently sealed and allowed to set overnight. The filter press was then pressurized to 10 psi, and the filtrate was collected. The amount of filtrate collected was measured and used in the following formula to determine the hydraulic conductivity:

$$K = \left(\frac{5.08}{P*47.38}\right)*\left(\frac{Q}{t}\right)$$

where K=hydraulic conductivity in cm/s, Q=filtrate collected in mL, t=time interval in seconds, and P=pressure factor, which converts air pressure into an equivalent pressure exerted by a column of water. The thermal conductivity of each grout sample was also tested in the manner described in Example 1. Table 2 below gives the hydraulic conductivity and the thermal conductivity of each sample tested. The hydraulic conductivity values and the thermal conductivity values for two other controls are also provided in Table 2.

TABLE 2

| Grout Slurry & Amount of Solids in the Slurry, % by weight of the slurry | Hydraulic Conductivity, cm/s | Thermal Conductivity, BTU/hr-ft-° F. |
| --- | --- | --- |
| IDP-232, 63.5% solids (control)[1] | $6.9 \times 10^{-6}$ | 0.977 |
| BAROTHERM, 70.4% solids (control)[2] | $6 \times 10^{-8}$ | 0.95 |
| THERMAL GROUT LITE, 65.1% solids (control)[3] | $<6.9 \times 10^{-8}$ | 1.0 |
| THERMAL GROUT SELECT, 70.4% solids (control)[3] | $<6.9 \times 10^{-8}$ | 1.2 |
| MIX 111 (control)[4] | $1 \times 10^{-16}$ | 1.4 |
| THERM-EX, 67% solids (control)[5] | $6 \times 10^{-8}$ | 1.05 |
| GEOTHERMAL GROUT, 68.3% solids (control)[6] | $5 \times 10^{-8}$ | 1.2 |
| IDP-357, 45% solids[7] | $5 \times 10^{-9}$ | 1.65 |

[1]The IDP-232 grout is described in U.S. Pat. No. 6,258,160, which is incorporated by reference herein. Its data is from testing conducted internally by the Industrial Drilling Products (IDP) laboratory.
[2]The BAROTHERM grout is commercially available from Halliburton Energy Services, Inc. Its data is from testing conducted internally by the Industrial Drilling Products (IDP) laboratory.
[3]The THERMAL GROUT LITE and SELECT grout are commercially available from GeoPro, Inc. Their data is from published literature by GeoPro, Inc.
[4]The formulation for the MIX 111 grout was made available to the public by the U.S. Department of Energy's Brookhaven National Laboratory. The MIX 111 grout is described in U.S. Pat. No. 6,251,179, which is incorporated by reference herein. Its data is taken from Brookhaven National Laboratory's web site located at www.bnl.gov/est/ghpfp.htm and entitled "Thermally Conductive Cementitious Grouts for Geothermal Heat Pumps."
[5]The THERM-EX grout is commercially available from WYO-BEN, Inc. Its data is from published literature by WYO-BEN, Inc.
[6]The GEOTHERMAL GROUT is commercially available from Colloid Environmental Technologies Co. (CETCO). Its data is from published literature by CETCO.
[7]The IDP-357 grout data is from testing conducted internally by the IDP laboratory.

Based on the results shown in Table 2, the grout slurry of the present application, i.e., the IDP-357 grout, exhibited a much higher thermal conductivity than the control grout slurries. Further, its hydraulic conductivity was lower than all of the control grout slurries except the MIX 111 grout slurry. As such, the grout slurry of the present application is recommended for use in installing a conduit such as a heat transfer loop in one or more holes in the earth.

Example 3

Laboratory tests were conducted to test and demonstrate the invention. In the tests, thermal conductivity was measured using the Baroid IDP Thermal Conductivity Meter available from Baroid Fluid Services, a Halliburton Company, in Houston, Tex., Examples of the ability of flaked graphite additions to increase the thermal conductivity of a base slurry containing varying amounts of graphite follow in Table 3.

TABLE 3

| AQUEOUS BENTONITE FLUID | THERMAL CONDUCTIVITY |
| --- | --- |
| Base without flaked graphite | TC-0.4 BTU/hr-ft-° F. |
| Base with 130 lb flaked graphite/100 gal | TC-0.8 BTU/hr-ft-° F. |
| Base with 145 lb flaked graphite/100 gal | TC-0.95 BTU/hr-ft-° F. |
| Premixed with 35% solids | TC-0.9 BTU/hr-ft-° F. |
| Premixed with 40% solids | TC-1.3 BTU/hr-ft-° F. |
| Premixed with 45% solids | TC-1.6 BTU/hr-ft-° F. |

Any of the above compositions may be pre-mixed one bag products.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A downhole servicing composition comprising:
    from about 15 percent to about 45 percent by weight of a first clay;
    from about 15 percent to about 45 percent by weight of a second clay;
    from about 10 percent to about 35 percent by weight of a filler; and
    from about 10 percent to about 75 percent by weight oVa carbon source.

2. The downhole servicing composition of claim 1 further comprising: up to about 2 percent by weight of an alkaline earth metal oxide or an alkaline earth metal hydroxide.

3. The downhole servicing composition of claim 2, wherein the alkaline earth metal oxide or earth metal hydroxide is magnesium oxide, strontium oxide, calcium hydroxide, barium hydroxide, or combinations thereof 4. The downhole servicing composition of claim 2 further comprising: from about 2 percent to about 10 percent by weight of a dispersant.

5. The downhole servicing composition of claim 4, wherein the dispersant is ammonium lignosulfonate salt, a metal lignosulfonate salt, a phosphate, a polyphosphate, an organophosphate, a phosphonate, a tannin, leonardite, a polyacrylate, or combinations thereof.

6. The downhole servicing composition of claim 1, further comprising water thereby forming a slurry, wherein the downhole servicing composition has a thermal conductivity not less than about 0.8 BTU/hr-ft-° F. when the dry components are present in an amount not exceeding about 50 percent by weight of the slurry.

7. The downhole servicing composition of claim 1 wherein the first clay has a first swelling rate, and the second clay has a second swelling rate less than the first swelling rate.

8. The downhole servicing composition of claim 1 wherein the first clay is sodium bentonite, montmorillonite, beidellite, nontronite, hectorite, samonite, smectite, or combinations thereof.

9. The downhole servicing composition of claim 1 wherein the second clay is calcium bentonite.

10. The downhole servicing composition of claim 1 wherein the filler is silica flour, silica fume, fly ash, pozzolan, sand, barite, zeolites, powdered glass, or combinations thereof 11. The downhole servicing composition of claim 1 wherein the downhole servicing composition is substantially free of water.

12. The downhole servicing composition of claim 1 wherein the carbon source is petroleum coke, pitch coke, tar coke, powdered carbon, flaked graphite, amorphous carbon, vein carbon, crystalline carbon, synthetic carbon, or combinations thereof.

13. The downhole servicing composition of claim 1 wherein the carbon source is flaked graphite.

14. The downhole servicing composition of claim 9 wherein the carbon source is flaked graphite.

15. The downhole servicing composition of claim 1 wherein the filler is sand, silica flour, silica fume, or combinations thereof.

16. The downhole servicing composition of claim 9 wherein the filler sand, silica flour, silica fume, or combinations thereof.

17. The downhole servicing composition of claim 14 wherein the filler is sand, silica flour, silica fume, or combinations thereof.

18. The downhole servicing composition of claim 1 wherein the first clay is sodium bentonite.

19. The downhole servicing composition of claim 9 wherein the first clay is sodium bentonite.

20. The downhole servicing composition of claim 14 wherein the first clay is sodium bentonite.

21. The downhole servicing composition of claim 17 wherein the first clay is sodium bentonite.

22. The downhole servicing composition of claim 1 wherein the first clay is sodium bentonite, the second clay is calcium bentonite, the filler is silica flour, and the carbon source is flaked graphite.

23. The downhole servicing composition of claim 22 further comprising:
- up to about 2 percent by weight of an alkaline earth metal oxide or an alkaline earth metal hydroxide selected from the group consisting of magnesium oxide, strontium oxide, calcium hydroxide, barium hydroxide, or combinations thereof; and
- from about 2 percent to about 10 percent by weight of a dispersant selected from the group consisting of ammonium lignosulfonate salt, a metal lignosulfonate salt, a phosphate, a polyphosphate, an organophosphate, a phosphonate, a tannin, leonardite, a polyacrylate, or combinations thereof.

24. The downhole servicing composition of claim 22 further comprising:
- up to about 2 percent by weight of magnesium oxide; and
- from about 2 percent to about 10 percent by weight of polyphosphate as a dispersant.

25. The downhole servicing composition of claim 1 wherein:
- the first clay is sodium bentonite, montmorillonite, beidellite, nontronite, hectorite, samonite, smectite, or combinations thereof;
- the second clay is calcium bentonite;
- the carbon source is petroleum coke, pitch coke, tar coke, powdered carbon, flaked graphite, amorphous carbon, vein carbon, crystalline carbon, synthetic carbon, or combinations thereof; and
- the filler is silica flour, silica fume, fly ash, pozzolan, sand, barite, zeolites, powdered glass, or combinations thereof; and further comprising:
- up to about 2 percent by weight of an alkaline earth metal oxide or an alkaline earth metal hydroxide selected from the group consisting of magnesium oxide, strontium oxide, calcium hydroxide, barium hydroxide, or combinations thereof; and
- from about 2 percent to about 10 percent by weight of a dispersant selected from the group consisting of ammonium lignosulfonate salt, a metal lignosulfonate salt, a phosphate, a polyphosphate, an organophosphate, a phosphonate, a tannin, leonardite, a polyacrylate, or combinations thereof.

* * * * *